(12) United States Patent
Ferullo et al.

(10) Patent No.: US 6,283,408 B1
(45) Date of Patent: Sep. 4, 2001

(54) ANTI-VIBRATION SUSPENSION DEVICE HAVING A TORSION SPRING, FOR A HELICOPTER

(75) Inventors: David Ferullo, Le Rove; Claude Bietenhader, Lambesc, both of (FR)

(73) Assignee: Eurocopter (FR)

( * ) Notice: Subject to any disclaimer, the term of this patent is extended or adjusted under 35 U.S.C. 154(b) by 0 days.

(21) Appl. No.: 09/468,166

(22) Filed: Dec. 21, 1999

(30) Foreign Application Priority Data

Dec. 29, 1998  (FR) .................................................. 98 16538

(51) Int. Cl.[7] ............................. B64C 27/00; B64D 27/00
(52) U.S. Cl. ............................................ 244/17.27; 244/54
(58) Field of Search ................................. 244/17.27, 54

(56) References Cited

U.S. PATENT DOCUMENTS

| | | | |
|---|---|---|---|
| 3,697,024 | * 10/1972 | Kosziech et al. | 248/15 |
| 3,945,628 | * 3/1976 | Halwes | 267/152 |
| 3,972,491 | * 8/1976 | Ferris et al. | 244/17.27 |
| 4,088,042 | * 5/1978 | Desjardins et al. | 74/574 |
| 4,405,101 | * 9/1983 | Carlson et al. | 244/17.27 |
| 4,431,148 | 2/1984 | Mouille | 244/17.27 |
| 4,458,862 | 7/1984 | Mouille | 244/17.27 |
| 4,766,984 | * 8/1988 | Gaffey | 244/17.27 |
| 4,974,794 | * 12/1990 | Aubry | 244/17.27 |
| 5,118,051 | * 6/1992 | Sheehy | 244/17.27 |
| 5,190,244 | 3/1993 | Yana | 244/17.27 |
| 5,782,430 | 7/1998 | Mouille | 244/17.27 |
| 5,788,182 | 8/1998 | Guimbal | 244/17.27 |
| 5,813,626 | * 9/1998 | Zoppitelli et al. | 244/17.27 |
| 6,145,785 | * 11/2000 | Certain | 244/17.27 |

* cited by examiner

Primary Examiner—Charles T. Jordan
Assistant Examiner—Christian M. Best
(74) Attorney, Agent, or Firm—Piper Marbury Rudnick & Wolfe

(57) ABSTRACT

The anti-vibration suspension device comprises at least three oblique bars, each articulated on the gearbox and on the structure by means of a rigid lever supporting an oscillating weight and in turn pivotally mounted by means of at least one pivot on this structure, and each lever is also joined to the gearbox by means of at least one torsion spring biassed about a torsion axis substantially perpendicular to the radial plane defined by the axes of the rotor and the corresponding oblique bar.

Figure 1:
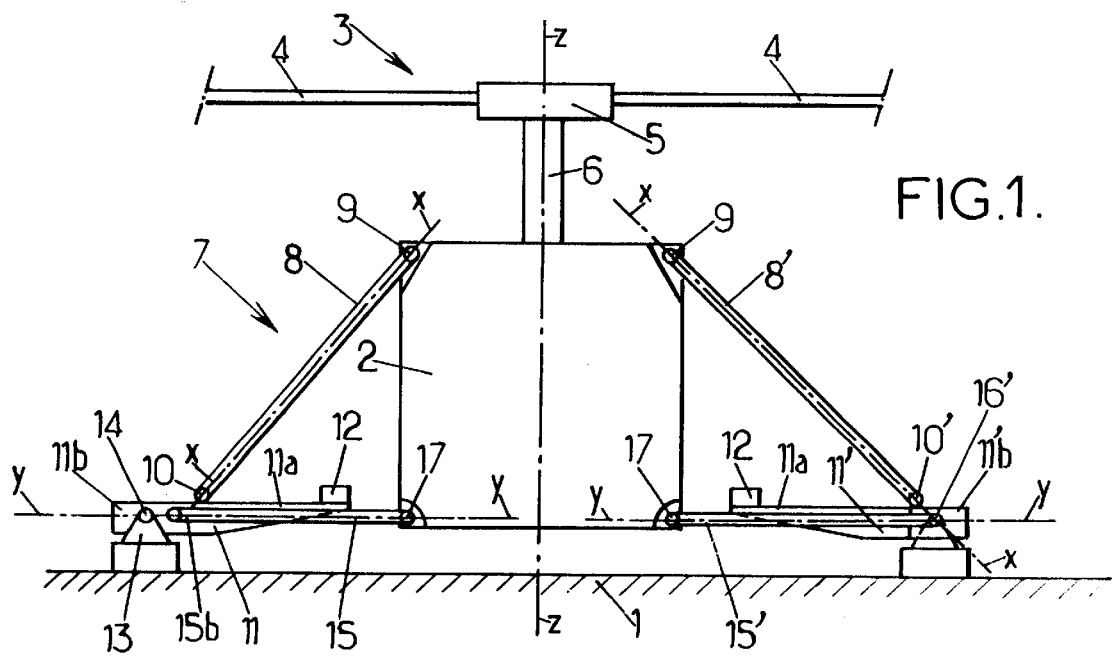

12 Claims, 1 Drawing Sheet

ANTI-VIBRATION SUSPENSION DEVICE HAVING A TORSION SPRING, FOR A HELICOPTER The invention relates to an anti-vibration or anti-resonance suspension device for a main helicopter rotor comprising a rotor shaft driven in rotation by a main gearbox about the axis of the shaft, which is the rotation axis of rotor.

An anti-vibration suspension device of this type is designed to be mounted on a helicopter, the structure of which supports, in general, on a mechanical floor on top of the fuselage, an engine assembly, the main rotor and the main gearbox, acting as a reducing gear and located between the engine assembly and the main rotor in order to drive the latter in rotation. An anti-vibration suspension device of this type is therefore inserted between the main gearbox and the helicopter structure, on the one hand to transmit static forces and torques, acting on the rotor, between the rotor and the structure and, on the other hand, to provide an effective damping or filtering action against the dynamic components of the forces and torques acting on the rotor and in particular the dynamic component of the force directed along the rotor shaft (pumping) and the forces and torques excited in the plane of the rotor.

The invention relates more specifically to an anti-vibration suspension device of the type comprising a set of at least three oblique and rigid bars for supporting the gearbox on the structure of the helicopter, these oblique bars being distributed around the gearbox and inclined relative to the rotor axis so as to converge with one another substantially at a point on the rotor axis, generally at their top ends, and such that the point of convergence is located between the hub, at the centre of the rotor, and the upper part of the gearbox, these oblique bars being articulated, on the one hand to the gearbox by means of their top ends, and on the other to the helicopter structure by their bottom ends and by means of rigid levers, a same number of these being provided as there are oblique bars, each lever supporting at least one oscillating weight at one end and being articulated to the structure by its opposite end part, in the vicinity of which the bottom end of a corresponding oblique bar is articulated on the corresponding lever, the articulated joints linking each lever to the structure and to the corresponding oblique bar being articulated joints which pivot at least about axes substantially perpendicular to a corresponding radial plane containing the axis of the rotor and the longitudinal axis of the corresponding oblique bar.

Suspension devices of this type are known from U.S. Pat. No. 4,458,862 and U.S. Pat. No. 4,431,148, in which each oblique bar is articulated at its top end directly on the upper part of the gearbox and at its bottom end on the external radial end, relative to the rotor axis, of one respectively of arms, equal in number to the number of oblique bars, and arranged radially around the base of the gearbox to which these arms are linked. Each arm is articulated on the structure in the region of its external radial end, which is rigid, and to which the corresponding rigid lever is attached or joined by its end opposite that supporting the corresponding oscillating weight.

In U.S. Pat. No. 4,458,862, the arms are radial extensions and substantially coplanar with the central part of a suspension plate, for suspending the gearbox on the structure, this central part being joined to the base of the gearbox and the arms, arranged in a star design around this central part, being rigid in their plane but flexible in a direction perpendicular to this plane, i.e. in the direction of the rotor axis. Accordingly, each arm constitutes a flexible blade between the central part of the plate fixed to the gearbox and the rigid, external radial end part of the arm which is articulated on the structure and on the bottom end of the corresponding oblique bar, and to which is attached or with which is joined the end of the lever on the side opposite the oscillating weight, the lever being oriented substantially radially either towards the interior (towards the rotor axis) or towards the exterior. The articulated joints of each arm permit deflections thereof by deformation in a direction perpendicular to the plane of the part thereof forming a flexible blade, and the unit comprising the corresponding lever and its oscillating weight form an anti-resonance or oscillating system, acting by inertia, and building up inertial forces which counterbalance the reactions at the linkage points to the structure corresponding to the deformations of the flexible blades of the plate.

U.S. Pat. No. 4,431,148 proposes an anti-resonant suspension device of this type which is simplified due to the fact that the suspension plate is independent of radial arms and comprises a thin membrane, which deforms by bending when subjected to forces exerted perpendicularly to its plane or pivot moments exerted around its centre by the gearbox but is rigid under the effect of traction/compression when subjected to forces and torques is exerted in its plane, such as the reaction torque occurring when the rotor is driven, this membrane being integrated in the upper structure of the fuselage.

As a result, each radial arm is directly linked to the base of the gearbox by means of a support bearing, which not only provides a pivot axis perpendicular to the radial plane containing this arm but also a flexible link which imparts a certain freedom of movement to the arm, both angularly and longitudinally, for example a laminated bearing with combined support, spherically and in translation.

Each radial arm may be made from a single piece having a flexible part on the one hand and, on the other hand, a rigid part at points of which the arm is articulated on the corresponding oblique bar, and on a corresponding structural support, and to which the rigid lever comprising the support for the corresponding oscillating weight is attached. In a preferred embodiment of the above-mentioned patent, however, each radial arm is formed by a flexible radial blade and by a part of a rigid lever, the other part of which constitutes the support for the corresponding oscillating weight, the outer radial end (relative to the rotor axis) of the blade being joined to the rigid lever in the region where the latter is articulated on the structural support of the fuselage.

This design involves using a complex laminated support bearing to provide the link between the inner radial end of each flexible blade to the gearbox, which fulfils a ball joint function and permits parasitic movement of the inner end of the flexible blade along its longitudinal axis when the blade is deformed due to bending.

This arrangement also involves using flexible blades which are difficult to design in terms of dimension and manufacture. Furthermore, the mounting between the rigid lever and the corresponding radial arm can cause problems due to fretting.

The underlying problem of the invention is to simplify an anti-vibration suspension device of this type, in particular by dispensing with blades which flex under bending and preferably also their complex support bearing on the base of the gearbox, thereby achieving very substantial savings on manufacturing, fiting and maintenance costs.

Another objective of the invention is to propose a simplified antivibration suspension device which is still compatible with the use of a membrane as proposed in U.S. Pat No. 4,431,148 in order to absorb the reaction to the driving torque and the forces acting on the base of the gearbox whilst securing the requisite degree of freedom in terms of pumping and rotation, the simplied device proposed by the invention simultaneously and advantageously being compatible with mono- or bi-directional suspensions comprising a pair of identical and parallel rod linkages articulated between the base of the gearbox and the structure, as described in U.S. Pat. No. 5,782,430 and U.S. Pat. No. 5,788,182, bringing additional savings compared with using a membrane.

To this end, the invention proposes an anti-vibration suspension device of the type outlined above, which is characterised in that each lever is also linked to the gearbox by at least one torsion spring, biassed about a torsion axis that is also substantially perpendicular to said corresponding radial plane.

The advantage of a device of this type is that each flexible blade used in devices of the existing art can essentially be replaced by at least one torsion spring, which is much easier to dimension, manufacture, fit and maintain than the component(s) which the torsion spring or springs replace(s), thereby simplifying the architecture of the device.

In a practical manner, each lever is also advantageously joined to the gearbox by at least one arm having two opposite end parts, a first of which is mounted on the base of the gearbox so as to pivot about an axis substantially perpendicular to the corresponding radial plane, and a second end part of which is joined to said lever by said at least one torsion spring.

Another advantage of a device of this type is that it dispenses with the complex support bearing needed in the embodiments of the prior art to join the flexible blades to the gearbox and these complex support bearings can be replaced by simple ball joints. Advantageously, the first end part of said at least one arm is articulated by means of a ball joint centered on a corresponding fixed point of said base of the gearbox and said fixed point is located substantially on the longitudinal axis of said lever and substantially in a plane perpendicular to the axis of the rotor and containing a pivot axis of said lever on the structure and the torsion axis of said at least one corresponding torsion spring.

In order to ensure appropriate loading of the torsion spring or springs by the angular deflections of the oscillator constituted by each lever and the corresponding at least one oscillating weight, and by the forces of the corresponding oblique bar, it is of advantage if the articulated mounting of the bottom end of the oblique bar on the lever is disposed radially inside the corresponding torsion axis relative to the axis of the rotor. With the same purpose in mind, it is also of advantage if said second end part of said at least one arm is joined by said at least one torsion spring at a part of said lever in the vicinity of the articulated mounting of said lever on the structure and preferably so that said corresponding torsion axis is in turn radially inside the pivot axis of the lever on the structure, relative to the axis of the rotor, or is substantially merged with said pivot axis.

In order to obtain balanced loading on each sub-assembly comprising an oblique bar and the corresponding lever with its oscillating weight or weights, it is also of advantage if at least one lever and preferably each of them is joined to the gear box by two arms disposed laterally on either side of said lever and arranged substantially symmetrically with one another relative to the longitudinal axis of said lever and if each of the two arms is joined to the corresponding lever by at least one torsion spring.

This being the case, for at least one lever and preferably for each of them, the two corresponding arms are advantageously articulated at a fixed point of the base of the gearbox by a single ball joint, the two arms being possibly joined to one another by their first end part articulated on the gearbox by means of this single ball joint.

In a simple, practical and economic manner, the torsion spring or springs co-operating with each lever may comprise one or more tubes or bars working in torsion, for example turned tubes, which are very easy to make and constitute the elastically deformable elements of the device.

In a first embodiment, for at least one lever and preferably for each of them, at least one corresponding arm is joined to said lever by at least one torsion tube or bar, an outer end of which, relative to the lever, is joined with said arm in movement and the other end of which is joined to said lever in movement.

In a second embodiment, which allows the space requirement of the torsion spring or springs co-operating with this lever to be decreased transversely relative to the longitudinal axis of a lever, at least one corresponding arm is advantageously joined to said lever by means of at least two torsion tubes or tube portions arranged coaxially about said torsion axis and at least partially inserted one inside the other, the inner tube or the inner tube portion optionally being a bar or a portion of bar.

The two torsion tubes or tube portions constituting two springs in series will advantageously be such that the inner end, relative to the lever, of the internal torsion tube or tube portion is joined to one of the two elements comprising the lever and the arm in movement and the outer end of the internal torsion tube or tube portion is joined to the outer end of the external torsion tube or tube portion in movement relative to the lever, the inner end is of said external torsion tube or tube portion relative to the lever being joined in movement to the other of the two elements comprising said arm and said lever.

In view of the forces applied to the gearbox in rotation about its axis and due to oscillations of the gearbox around the focal point at which the axes of the oblique bars converge and due in particular to the reaction torque to the driving torque of the rotor and other forces and moments in the plane substantially of the base of the gearbox, it is also of advantage if each oblique bar is articulated by its top and bottom ends respectively on a top part of the gearbox and on the corresponding lever by means of one of two respective ball joints centered in said corresponding radial plane.

Furthermore, in order to reduce the transverse space requirement (relative to the rotor axis) of the device, each lever is advantageously oriented so that said at least one corresponding oscillating weight is radially inside the articulated mountings of said lever on the structure and of said oblique bar on the lever, as well as inside said torsion axis of the at least one corresponding torsion spring relative to the rotor axis.

As a result, maintenance of the suspension device proposed by the invention is simplified because the flexible elements permitting deformation and/or displacement substantially parallel with the axis of the rotor are arranged close to the oblique bars and hence readily accessible.

Figure 2:
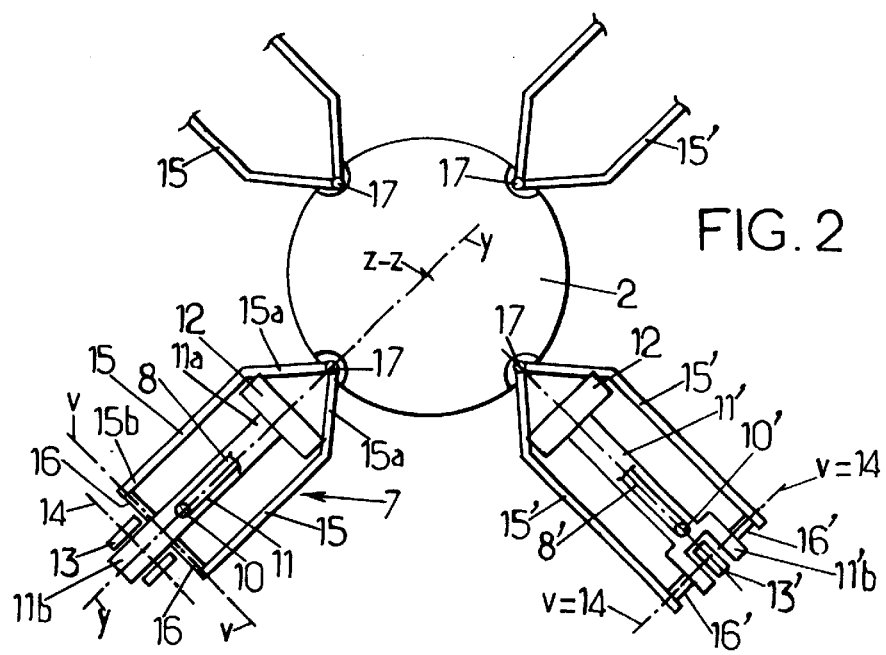
Figure 3:
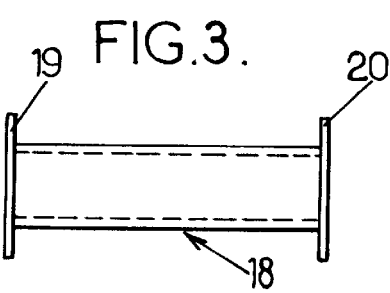
Figure 4:
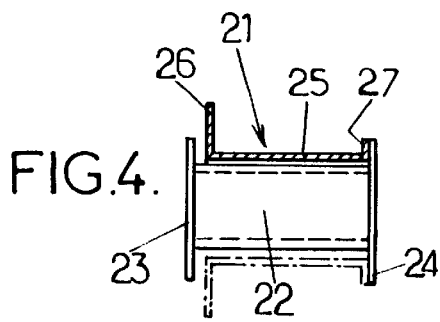

Other features and advantages of the invention will become clear from the description below, given by way of illustration and not restrictive in any respect, of examples of embodiments described with reference to the appended drawings, in which:

FIG. 1 is a schematic illustration in side elevation of a first and a second embodiment of the suspension device proposed by the invention, respectively in half-views at the left-hand side and right-hand side of this FIG. 1, FIG. 2 is a schematic plan view of the two embodiments illustrated in FIG. 1, shown respectively in half-views at the left-hand and right-hand sides of FIG. 2, FIG. 3 is a view in side elevation of a torsion tube, which may be used as a torsion spring in the devices illustrated in FIGS. 1 and 2, and FIG. 4 is a schematic view in partial section and partial side elevation of a double torsion tube having two tubes in series inserted one inside the other, which may also be used as a torsion spring in the devices illustrated in FIGS. 1 and 2.

The first example shown in the left-hand half-views and the second example illustrated in the right-hand half-views of FIGS. 1 and 2 are described in parallel, the same reference numerals being used to denote similar parts, a prime symbol being added in the case of the second example.

In FIG. 1 there is generally shown a schematic illustration of a primary structure 1 of the fuselage of a helicopter, on a mechanical deck defined by this primary structure 1 above the helicopter cockpit, for supporting an engine assembly (not illustrated), a main gearbox 2 and a main rotor 3.

The blades 4 of the rotor 3 are linked to a hub 5, which is joined in rotation to a rotor mast 6 driven in rotation about its longitudinal axis, being the rotation axis Z-Z of the rotor, by its base in the gearbox 2, designed as a reduction gear on the kinematic chain between the engine assembly and the mast 6 in order to drive the rotor 3 in rotation.

The gearbox 2 and the rotor 3 are suspended on the structure 1 by means of a suspension device 7, which filters the pumping excitations (along Z-Z) and the excitation caused by forces and torques in the plane of the rotor 3. Similarly to the devices disclosed in U.S. Pat. No. 458,862 and U.S. Pat. No. 4,431,148, this suspension device 7 comprises a set of four rigid and oblique bars 8 or 8' is substantially regularly distributed around the gearbox 2. Each bar 8 or 8' is straight and its longitudinal axis x-x extends in one of four respective substantially radial half-planes containing the axis Z-Z and distributed about this axis Z-Z (for example at 90° from one another) so that two half-planes are directed towards the front and towards the sides of the helicopter and the other two half-planes are directed towards the rear and towards the sides, each of the four half-planes being inclined in this example at approximately 45° to the longitudinal axis of the helicopter.

The oblique bars 8 or 8' are inclined in these half-planes so that they converge with one another at their top ends towards a focal point located substantially on the axis Z-Z below or on a level with the hub 5. Each oblique bar 8 or 8' is articulated at its top end by means of a ball joint 9 on the top part of the housing of the gearbox 2 and each bar 8 or 8' is also articulated and linked by its bottom end to the structure 1 via a straight, rigid lever 11 or 11', the longitudinal axis y-y of which extends substantially radially relative to the axis Z-Z in the same substantially radial plane containing the axis x-x of the oblique bar 8 or 8'. This lever 11 or 11' supports an oscillating weight 12 at its end closer to the axis Z-Z or inner radial end such as 11a, whilst at its opposite end part or outer radial end part 11b or 11'b, the lever 11 or 11' is articulated on a structural support 13 or 13' of the primary structure 1 of the fuselage so as to be able to at least swivel about a pivot 14, the axis of which is substantially perpendicular to the substantially radial plane containing the axes x-x and y-y of the oblique bar 8 or 8' and the lever 11 or 11'.

The bottom end of each oblique bar 8 or 8' is articulated by means of a ball joint 10 or 10' on a zone of the lever 11 or 11' which is closer to the pivot 14 of this lever 11 or 11' on the structural support 13 or 13' than to the oscillating weight 12, this zone even being located, in the second example of the right-hand half views of FIGS. 1 and 2, in the immediate vicinity of the pivot 14 of the lever 11' on the structural support 13', i.e. in the vicinity of the outer radial end part 11'b of the lever 11', relative to the axis Z-Z.

Each mono-directional anti-resonant oscillator, constituted by a lever 11 or 11' with its oscillating weight 12, is therefore articulated on the bottom end of the corresponding oblique bar 8 or 8' and on the structure 1, at least so as to pivot about axes substantially perpendicular to the corresponding substantially radial plane containing the axes x-x and y-y of the bar 8 or 8' and the lever 11 or 11' and in which plane the ball joints 9 and 10 or 10' about which the bar 8 or 8' pivots on the box 2 and the lever 11 or 11' are centered.

The essential feature of the anti-vibration or anti-resonant device proposed by the invention is that each lever 11 or 11' is also linked to the gearbox 2 by at least one arm 15 or 15' and at least one torsion spring 16 or 16' biassed about a torsion axis v-v also substantially perpendicular to the corresponding substantially radial plane (x-x, y-y) when the box 2 is displaced along the axis Z-Z.

Each arm 15 or 15' has two opposite end parts, a first or inner radial end of which, 15a (directed towards the axis Z-Z of the rotor), is articulated on the base of the gearbox 2, at least so as to pivot about an axis substantially perpendicular to the corresponding substantially radial plane (xx, y-y), whilst the second end part, 15b, or outer radial end is linked to the lever 11 or 11' by at least one torsion spring 16 or 16'.

More specifically, the inner radial end part, 15a, of each arm 15 or 15' is articulated by a ball joint 17 centered on a corresponding fixed point substantially on the periphery of the base of the gearbox 2, this fixed point or centre of the ball joint 17 being disposed substantially on the longitudinal axis y-y of the lever 11 or 11' and substantially in a plane perpendicular to the axis Z-Z of the rotor 3 and containing the axis of the pivot 14 of the lever 11 or 11' on the corresponding structural support 13 or 13' and the torsion axis v-v of the corresponding torsion spring 16 or 16'. This torsion spring 16 or 16' links the outer radial end part 15b of the arm 15 or 15' to the part of the lever 11 or 11' in the vicinity of the articulated mounting of the lever 11 or 11' on the corresponding structural support 13 or 13'. The corresponding oscillating weight 12 is located radially inside of the ball joint 10 or 10' of the bottom end of the oblique bar 8 or 8' on the lever 11 or 11', relative to the axis Z-Z of the rotor, this ball joint 10 or 10' being in turn radially inside the torsion axis v-v of the torsion spring 16 or 16', and this weight 12 is flxed above the inner radial end 11a of the lever 11 or 11' extending transversely above each arm 15 or 15' without impeding the latter when the device is operating.

As illustrated in the first example of FIGS. 1 and 2, the torsion axis v-v of the torsion spring 16 is itself located radially to the inside of the axis of the pivot 14 of the lever 11 on the structural support 13, relative to the axis z-z, these two axes v-v and 14 remaining substantially parallel with one another. In the second example, however, the torsion axis v-v essentially merges with the axis of the pivot 14 of the lever 11' on the structural support 13'. For this reason, the outer end part 11'b of the lever 11' is of a forkshaped design, between the branches of which the structural support 13' is received as a single point of attachment, unlike the first example, where the structural support 13 has two points of attachment between which the end 11b of the lever 11 is pivotally mounted. In the second example, it is therefore easier to fix the inner lateral end of the spring 16' to a branch of the fork of the outer end 11'b of the lever 11' without impeding with the pivotal mounting of this end 11'b of the lever 11' on the structural support 13'. Each arm 15' in the second example differs from the arms 15 illustrated in the first example only in that it is slightly longer due the fact that the torsion axis v-v is set back on a level with the pivot axis 14.

In the examples illustrated in FIGS. 1 and 2, in order to provide symmetry in the structure and the forces applied to the device, each lever 11 is or 11' is joined to the gearbox 2 by two arms 15 or 15' arranged laterally on either side of the lever 11 or 11' and symmetrically with one another relative to the longitudinal axis y-y of the lever 11 or 11'. The inner radial end parts 15a of the two arms 15 or 15' are inclined towards this axis y-y and joined to one another forming a V-shape which is articulated at its tip on the corresponding fixed point on the base of the gearbox 2 by a same and single ball joint 17. The remainder of each arm 15 or 15' extends substantially parallel with the lever 11 or 11' and, at its outer radial end part 15b, each arm 15 or 15' is linked to the outer radial part 11b or 11'b of the lever by a single torsion spring 16 or 16'.

Each of the two torsion springs 16 or 16' co-operating in this manner with the lever 11 or 11' may be a simple spring comprising a torsion tube or bar made from titanium for example, machined by turning and such as illustrated by reference 18 in FIG. 3, with two axial end collars, an internal collar 19 directed towards the lever 11 or 11' and by means of which this inner end of the torsion spring 18 is joined in movement to the lever 11 or 11', and a collar 20 at the outer end of the torsion spring 18, hence directed towards the corresponding arm 15 or 15', and which is joined in movement to this arm 15 or 15'.

By way of example, this titanium torsion tube may be 10 cm in length with external and internal diameters of 26 mm and 22 mm respectively.

However, as a variant, each torsion spring as shown by 16 or 16' may comprise two torsion springs in series, in the form of a double torsion tube as illustrated by reference 21 in FIG. 4. This double torsion tube 21 comprises two torsion tubes or parts of tubes arranged coaxially about a common torsion axis v-v, these two tubes or parts of tubes being at least partially inserted one inside the other. As a variant, the internal torsion tube may be replaced by a torsion bar.

In the example illustrated in FIG. 4, an internal torsion tube 22 with inner 23 and outer 24 end collars (relative to the lever 11 or 11') is coaxially inserted inside an external torsion tube or part tube 25 having inner 26 and outer 27 end collars or collar parts, the outer collar or collar part 27 being joined in movement to the outer collar 24 of the internal tube 22. Two types of assembly are possible: either the inner collar 23 of the internal tube 22 is joined in movement to the corresponding lever 11 or 11', in which case the inner collar or part collar 26 of the external tube or part tube 25 is joined in movement to the corresponding arm 15 or 15', or, conversely, the inner collar 23 of the internal tube 22 is joined in movement to the arm 15 or 15', in which case it is the inner collar or part collar 26 of the external tube or part tube 25 which is joined in movement to the lever 11 or 11'. The advantage of the variant illustrated in FIG. 4 as compared with that of FIG. 3 is that the transverse (relative to the lever 11 or 11') space requirement of the torsion spring is reduced and/or its stiffness increased.

It should be pointed out that the device described above operates in exactly the same way as the devices described in U.S. Pat. No. 4,458,862 and U.S. Pat. No. 4,431,148, the essential difference being that this invention provides the requisite flexibility, essentially along the axis Z-Z of the rotor 3, due to the loading of the torsion springs shown by 16 or 16' between the levers 11 or 11' and the gearbox 2.

The suspension device proposed by the invention is economic in architectural design compared with the systems used by the prior art, offering a significant cost saving by replacing flexible blades with torsion-operated springs and by dispensing with the bearings for the flexible blades on the gearbox and replacing them with simple ball joints. The suspension device proposed by the invention is easier to maintain because the flexible elements, namely the torsion springs, are dose to the oblique bars and therefore readily accessible. Furthermore, the suspension device proposed by the invention is easier to integrate on the mechanical deck of the is helicopter than is the case with known devices. Finally, the suspension device proposed by the invention weighs less than that used with similar devices known from the prior art because the weight of the torsion springs is less than that of flexible blades, especially if the torsion springs are provided in the form of torsion tubes, machined by turning and hence very simple and economic to manufacture.

The anti-resonant suspension devices proposed by the invention are compatible with any additional means which might be required, in particular for transmitting to the structure of the fuselage the reaction to the engine torque on the gear box whilst allowing slight vertical displacements and angular oscillations of the gearbox about axes located in the plane of the base of this gearbox, these additional means being a suspension membrane joined to the base of the gearbox on the one hand and to the structure of the fuselage around this box on the other, as disclosed in U.S. Pat. No. 4,431,148, or alternatively devices with pairs of identical and parallel linking rods articulated between the base of the gearbox and the fuselage structure, optionally by means of a torsion tube or levers co-operating with resilient return means, as disclosed in U.S. Pat. No. 5,782,430 and U.S. Pat. No. 5,788,182, which propose, between the upper structure of the fuselage and the base of the main gearbox, a link having a greater rigidity in the plane of this upper structure.

What is claimed is:

1. An anti-vibration suspension device for a main helicopter rotor comprising a rotor mast driven in rotation by a main gear box about an axis of the mast, which is the axis of rotation of the rotor, the suspension device including at least three rigid and oblique bars for supporting the gearbox on a helicopter structure, the oblique bars being distributed around the gearbox and inclined relative to the rotor axis so as to converge with one another substantially at top ends towards a point on the rotor axis, the oblique bars being articulated and joined on the one hand to the gearbox by means of said top ends and on the other hand to the helicopter structure by bottom ends and by means of rigid lever, a same number of said levers being provided as there are oblique bars, each lever supporting at least one oscillating weight at one end and being articulated and joined to the structure by an opposite end part, in the vicinity of which the bottom end of a corresponding oblique bar is articulated on the corresponding lever, the articulated joints linking each lever to the structure and to the corresponding oblique bar being articulated joints which pivot at least about axes substantially perpendicular to a corresponding radial plane containing the axis of the rotor and a longitudinal axis of the corresponding oblique bar, wherein each lever is also linked to the gearbox by at least one torsion spring, biassed about a torsion axis also substantially perpendicular to said corresponding radial plane.

2. A suspension device as claimed in claim 1, wherein for at least one lever, the articulated joint of the bottom end of the oblique bar on the lever is disposed radially inside the corresponding torsion axis relative to the axis of the rotor.

3. A suspension device as claimed in claim 1, wherein, for at least one lever, said corresponding torsion axis is radially inside the pivot axis of the lever on the structure, relative to the axis of the rotor, or is substantially merged with said pivot axis.

4. A suspension device as claimed in claim 1, wherein each lever is also joined to the gearbox by means of at least one arm having two opposite end parts, a first of which is articulated so as to pivot about an axis substantially perpendicular to said corresponding radial plane on the base of the gearbox and the second end part of which is joined to said lever by said at least one torsion spring.

5. A suspension device as claimed in claim 4, wherein said first end part of said at least one arm is articulated by means of a ball joint centered on a corresponding fixed point of said base of the gearbox, said fixed point being located substantially on a longitudinal axis of said lever and substantially in a plane perpendicular to the axis of the rotor and containing the pivot axis of said lever on the structure and the torsion axis of said corresponding at least one torsion spring.

6. A suspension device as claimed in claim 4, wherein said second end part of said at least one arm is joined by said at least one torsion spring to a part of said lever in the vicinity of the pivot axis of said lever on the structure.

7. A suspension device as claimed in claim 4, wherein at least one lever is joined to the gearbox by two arms disposed laterally on either side of said lever and substantially symmetrical with one another relative to a longitudinal axis of said lever and each of the two arms is joined to the corresponding lever by means of at least one torsion spring.

8. A suspension device as claimed in claim 7, wherein for at least one lever, the two corresponding arms are pivotally mounted on a fixed point of the base of the gearbox by means of a single ball joint.

9. A suspension device as claimed in claim 1, wherein for at least one lever, at least one corresponding arm is joined to said lever by at least one torsion member, an outer end of which relative to the lever is joined in movement to said arm and the other inner end of which relative to the lever is joined in movement to said lever.

10. A suspension device as claimed in claim 1, wherein for at least one lever, at least one corresponding arm is joined to said lever by at least two torsion members, arranged substantially coaxially about said torsion axis and at least partially inserted one inside the other.

11. A suspension device as claimed in claim 10, wherein for said at least one lever, the two torsion members are torsion tubes or portions of tube such that an inner end of an internal torsion tube or portion of tube, relative to the lever, is joined in movement to one of the two elements comprising the lever and the arm and an outer end of the internal torsion tube or portion of tube is joined in movement to an outer end relative to the lever of an outer torsion tube or portion of tube, an inner end of which relative to the lever is joined in movement to the other of the two elements comprising said arm and said lever.

12. A suspension device as claimed in claim 1, wherein each lever is oriented so that said at least one corresponding oscillating weight is radially inside the pivot axes of said lever on the structure and of said oblique bar on the lever, as well as inside said torsion axis of said corresponding at least one torsion spring relative to the axis of the rotor.

* * * * *